(12) United States Patent
Takeda et al.

(10) Patent No.: US 11,089,623 B2
(45) Date of Patent: Aug. 10, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Qin Mu, Beijing (CN); Liu Liu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 82 days.

(21) Appl. No.: 16/482,902

(22) PCT Filed: Feb. 2, 2018

(86) PCT No.: PCT/JP2018/003539
§ 371 (c)(1),
(2) Date: Aug. 1, 2019

(87) PCT Pub. No.: WO2018/143388
PCT Pub. Date: Aug. 9, 2018

(65) Prior Publication Data
US 2020/0245351 A1    Jul. 30, 2020

(30) Foreign Application Priority Data

Feb. 2, 2017 (JP) ............................. JP2017-017971

(51) Int. Cl.
*H04W 72/12* (2009.01)
*H04W 72/04* (2009.01)

(52) U.S. Cl.
CPC ... *H04W 72/1289* (2013.01); *H04W 72/0446* (2013.01)

(58) Field of Classification Search
CPC .................. H04W 72/1289; H04W 72/0446
See application file for complete search history.

(56) References Cited

U.S. PATENT DOCUMENTS

| 9,918,335 | B2* | 3/2018 | Kim | ..................... H04L 5/0007 |
| 2015/0304995 | A1* | 10/2015 | Yi | ........................ H04L 5/0007 370/329 |

(Continued)

OTHER PUBLICATIONS

International Search Report issued for PCT/JP2018/003539, dated Apr. 3, 2018 (5 pages).

(Continued)

*Primary Examiner* — Will W Lin
(74) *Attorney, Agent, or Firm* — Osha Bergman Watanabe & Burton LLP

(57) ABSTRACT

The present invention provides a user terminal and a radio communication method, whereby data communication processes can be performed adequately even when downlink control channels that are different from those of existing LTE systems are configured. A user terminal has a receiving section that receives downlink control information, which is transmitted via a downlink control channel in a control resource set configured in a predetermined resource block, and a control section that controls receipt of downlink data scheduled in a predetermined frequency field, based on the downlink control information, and the downlink data is allocated over the predetermined frequency field from the same time location, or allocated to the predetermined frequency field from varying time locations.

4 Claims, 15 Drawing Sheets

(56) References Cited

U.S. PATENT DOCUMENTS

2017/0086220 A1* 3/2017 Kim .................. H04W 72/1289
2018/0124752 A1* 5/2018 Takeda ................ H04W 72/042
2020/0187236 A1* 6/2020 Moon .................. H04L 5/0044

OTHER PUBLICATIONS

Written Opinion issued for PCT/JP2018/003539, dated Apr. 3, 2018 (3 pages).
Ericsson; "Summary of offline discussion on group common PDCCH"; TSG-RAN WG1 NR AdHoc R1-1701498; Spokane, WA, USA, Jan. 16-20, 2017 (2 pages).
3GPP TR 38.802 V1.1.0; "3rd Generation Partnership Project; Technical Specification Group Radio Access Network; Study on New Radio (NR) Access Technology Physical Layer Aspects (Release 14)"; Jan. 2017 (4 pages).
CATT; "Indication of NR-PDSCH starting symbol"; 3GPP TSG RAN WG1 AH_NR Meeting R1-1700194; Spokane, USA, Jan. 16-20, 2017 (2 pages).
Nokia, Alcatel-Lucent Shanghai Bell; "Dynamic reuse of DL control resources for data in NR"; 3GPP TSG-RAN WG1#NR R1-1701012; Spokane, WA, USA, Jan. 16-20, 2017 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
3GPP TSG RAN WG1 Meeting #89; R1-1707993 "Multiplexing NR-PDCCH and PDSCH" Samsung; Hangzhou, China; May 15-19, 2017 (5 pages).
3GPP TSG RAN WG1 NR Ad Hoc Meeting; R1-1700419 "Discussion on PRB sharing between NR-PDCCH and eMBB data" Huawei, HiSilicon; Spokane, USA; Jan. 16-20, 2017 (9 pages).
3GPP TSG RAN WG1 Meeting #90; R1-1713271 "On resource sharing between PDCCH and PDSCH" Guangdong OPPO Mobile Telecom; Prague, Czech; Aug. 21-25, 2017 (6 pages).
Extended European Search Report issued in European Application No. 18747734.4, dated Nov. 9, 2020 (9 pages).

* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using 1-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ: Hybrid Automatic Repeat reQuest) and so on.

A radio base station controls the allocation (scheduling) of data for a user terminal, and reports the schedule of data to the user terminal using downlink control information (DCI). The user terminal controls the receipt of DL data and/or transmission of uplink data based on the downlink control information. To be more specific, based on the downlink control information, the user terminal receives downlink data in the same subframe as the downlink control information, or transmits uplink data in a predetermined subframe in a predetermined period (for example, 4 ms later).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, LTE Rel. 14, 15 or later versions, 5G, NR, etc.) are assumed to control data scheduling based on different configurations from those of existing LTE systems (for example, LTE Rel. 13 or earlier versions).

For example, in existing LTE systems, DL data is scheduled in each subframe based on downlink control information that is transmitted every predetermined transmission time interval (subframe).

The downlink control information is allocated in a downlink control channel (PDCCH: Physical Downlink Control Channel) that is defined over a predetermined number of symbols (one to three symbols) from the head of a subframe, over the system band.

Meanwhile, in future radio systems, a study is in progress to change the allocation of the above downlink control information and/or the downlink control channel and to use the radio resources that have become available then. In such radio communication systems, how to control the location to allocate data in each slot is the problem.

The present invention has been made in view of the above, and it is therefore an object of the present invention to provide a user terminal and a radio communication method, whereby data communication processes can be performed adequately even when different downlink control channels from those of existing LTE systems are configured.

Solution to Problem

A user terminal, according to one aspect, has a receiving section that receives downlink control information, which is transmitted via a downlink control channel in a control resource set configured in a predetermined resource block, and a control section that controls receipt of downlink data scheduled in a predetermined frequency field, based on the downlink control information, and the downlink data is allocated over the predetermined frequency field from the same time location, or allocated to the predetermined frequency field from varying time locations.

Advantageous Effects of Invention

According to the present invention, even when different downlink control channels from those of existing LTE systems are configured, data communication processes can be performed adequately.

DESCRIPTION OF EMBODIMENTS

Figure 1:
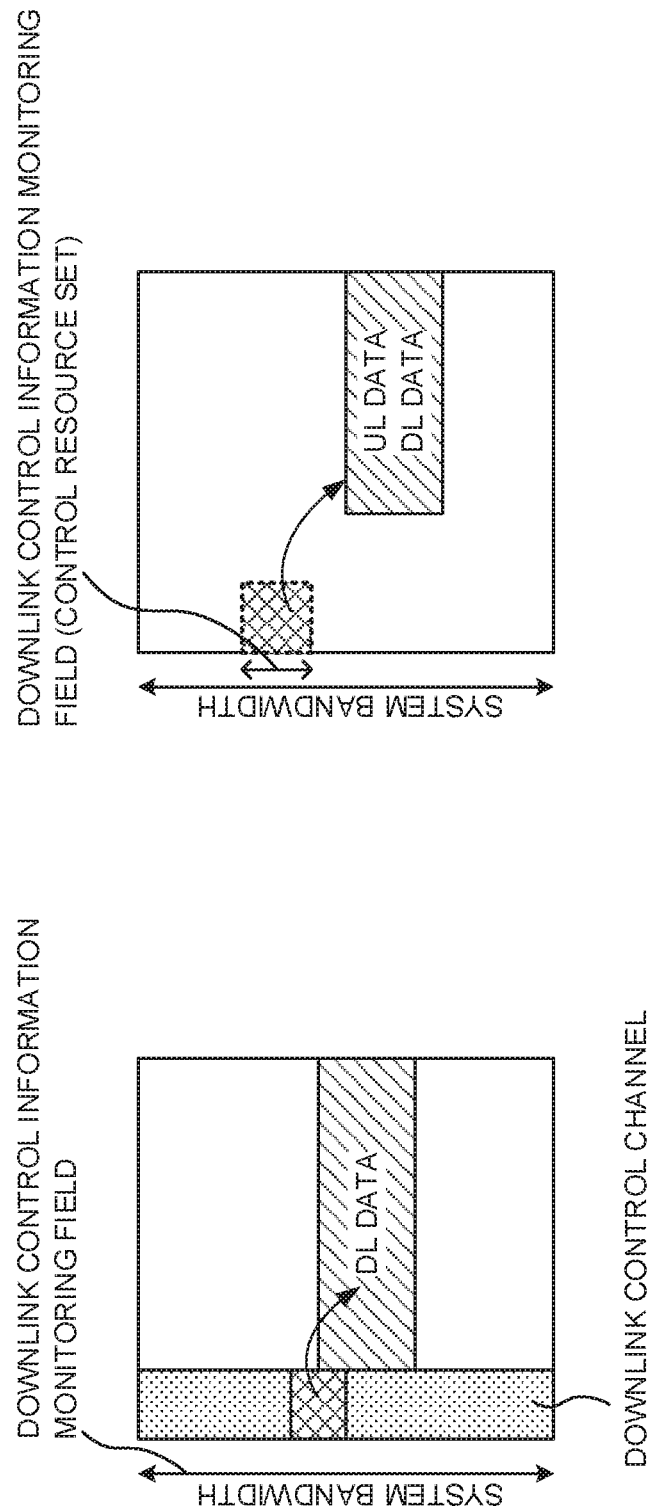
FIGS. 1A and 1B are diagrams to explain the frequency band for monitoring downlink control channels.

In existing LTE systems, a base station transmits downlink control information (DCI) to a UE using a downlink control channel (for example, PDCCH (Physical Downlink Control Channel), enhanced PDCCH (EPDCCH (Enhanced PDCCH), etc.). Transmission of downlink control information may be interpreted as transmission of a downlink control channel.

DCI may be scheduling information, including at least one of, for example, data-scheduling time/frequency resources, transport block information, data modulation scheme information, HARQ retransmission information, demodulation RS information, and so on. DCI that schedules receipt of DL data and/or measurements of DL reference signals may be referred to as "DL assignment" or "DL grant," and DCI that schedules transmission of UL data and/or transmission of UL sounding (measurement) signals may be referred to as "UL grant." DL assignments and/or UL grants may include information related to the resources, sequences and transmission formats of channels for transmitting UL control signals (UCI: Uplink Control Information) such as HARQ-ACK feedback in response to DL data, channel measurement information (CSI: Channel State Information) and so on. Also, apart from DL assignments and UL grants, DCI for scheduling UL control signals (UCI: Uplink Control Information) may be defined.

A UE is configured to monitor a set of a predetermined number of downlink control channel candidates. To "monitor" in this case means, for example, attempting to decode each downlink control channel for a target DCI format, in the set. Such decoding is also referred to as "blind decoding (BD)" or "blind detection." Downlink control channel candidates are also referred to as "downlink control channel allocation candidates," "BD candidates," "(E)PDCCH candidates," "DCI candidates," and so on.

The set of downlink control channel candidates (multiple downlink control channel candidates) to be monitored is also referred to as a "search space." A base station places DCI in a predetermined downlink control channel candidates included in the search space. The UE performs blind decoding for one or more candidate resources in the search space, and detects the DCI addressed to the UE. The search space may be configured by high layer signaling that is common between users, or may be configured by user-specific high layer signaling.

In existing LTE systems, a plurality of aggregation levels (ALs) are provided in a search space for the purpose of link adaptation. The ALs correspond to the numbers of control channel elements (CCEs)/enhanced control channel elements (ECCEs: Enhanced CCEs) that constitute DCI. Also, the search space is configured so that there are multiple downlink control channel candidates for a given AL. Each downlink control channel candidate is comprised of one or more resource units (CCEs and/or ECCEs).

Cyclic redundancy check (CRC) bits are attached to the DCI. The CRC is masked (scrambled) using UE-specific identifiers (for example, cell-radio network temporary identifiers (C-RNTIs)) or a system-common identifier. The UE can detect the DCI where the CRC is scrambled using the C-RNTI for the subject terminal, and the DCI where the CRC is scrambled using the system-common identifier.

Also, as for the search spaces, there are a common search space (C-SS) that is configured for UEs on a shared basis, and a UE-specific search space (UE-SS) that is configured for each UE.

Future radio communication systems (for example, LTE Rel. 14, 15 and/or later versions, 5G, NR, etc.) are under study to introduce multiple numerologies, not a single numerology.

A numerology may refer to a set of communication parameters that characterize the design of signals in a given RAT (Radio Access Technology), the design of the RAT and so on, and may be parameters that relate to the frequency direction and/or the time direction, such as subcarrier spacing (SCS), symbol duration, cyclic prefix duration, subframe duration and so on. For example, future radio communication systems may support multiple SCS spacings such as 15 kHz, 30 kHz, 60 kHz, 120 kHz and 240 kHz.

Also, future radio communication systems are being studied to introduce time units (also referred to as "subframes," "slots," "mini-slots," "subslots," "transmission time intervals (TTIs)," "short TTIs," "radio frames" and so on) that are the same and/or different from those of existing LTE systems (LTE Rel. 13 or earlier versions), while supporting multiple numerologies and so on.

Note that a TTI may represent the time unit for use when transmitting/receiving transport blocks for transmitting/receiving data, code blocks and/or codewords. Assuming that a TTI is provided, the period of time (for example, the number of symbols) where the transport blocks, the code blocks and/or the codewords of data are actually mapped may be shorter than the TTI.

For example, when a TTI is formed with a predetermined number of symbols (for example, fourteen symbols), the transport blocks, the code blocks and/or the codewords of transmitting/receiving data can be transmitted and received in one or a predetermined number of symbol periods among these. If the number of symbols in which transport blocks, code blocks and/or codewords of transmitting/receiving data are transmitted/received is smaller than the number of symbols constituting the TTI, reference signals, control signals and so on can be mapped to symbols in the TTI where no data is mapped.

Subframes may serve as a time unit having a predetermined time duration (for example, 1 ms), irrespective of which numerology is used by (and/or configured in) the user terminal (for example, UE (User Equipment)).

On the other hand, slots may serve as a time unit that is based on the numerology used by the UE. For example, if the subcarrier spacing is 15 kHz or 30 kHz, the number of symbols per slot may be seven or fourteen. When the subcarrier spacing is 60 kHz or greater, the number of symbols per slot may be fourteen. In addition, a slot may include a plurality of mini-slots (subslots).

Generally, subcarrier spacing and symbol duration hold a reciprocal relationship. Therefore, as long as the number of symbols per slot (or mini-slot (subslot)) stays the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

Furthermore, in future radio communication systems, communication may not be performed using the whole system band in a predetermined carrier at all times, and it is more likely that communication will be controlled by configuring predetermined frequency fields (also referred to as "frequency bands"), dynamically or semi-statically, depending on the purpose of communication and/or the communicating environment.

Now, in conventional LTE systems, a downlink control channel (or downlink control information) is transmitted using the whole system bandwidth (see FIG. 1A). Therefore, regardless of whether or not DL data is allocated in each subframe, a UE needs to monitor the whole system bandwidth to receive (blind-decode) downlink control information.

By contrast with this, in future radio communication systems, downlink control information for a given UE needs not be necessarily allocated to the whole system band and transmitted, and, instead, transmission of downlink control information may be controlled by configuring a predetermined frequency field in the UE (see FIG. 1B). The predetermined frequency filed that is configured in the UE may be referred to as a "control resource set (CORSET)," a "control subband," a "search space set." a "search space resource set," a "control field," a "control subband," an "NR-PDCCH field," and so on.

A control resource set is constituted by predetermined resource units, and can be configured to be equal or less than the system bandwidth (carrier bandwidth). For example, a control resource set may be constituted by one or more RBs (PRBs and/or VRBs) in the frequency direction. Here, an RB refers to, for example, a frequency resource block unit comprised of twelve subcarriers. The UE can monitor for downlink control information within the range of the control resource set, and control receipt. By this means, in the receiving process of downlink control information, the UE does not have to keep monitoring the whole system bandwidth at all times, so that its power consumption can be reduced.

Also, a plurality of control resource sets may be arranged in one slot. For example, in the example illustrated in FIG. 2, control resource sets 1 and 2 are arranged in one slot. Each control resource set is comprised of two symbols. These multiple control resource sets may be configured in completely or partially overlapping frequency resources, or may be configured in different frequency resources. Also, these multiple control resource sets may be formed with different numbers of OFDM symbols. Also, two or more control resource sets, as well as search spaces included therein, may be configured in a given UE. Although, for ease of explanation, cases will be described below in which every control resource set contains a different UE's (or UE group's) search space, this is in practice not the case. In the example illustrated in FIG. 2, control resource set 1 contains downlink control information for UEs #1 to #3. Control resource set 2 contains downlink control information for UEs #4 and #5.

Figure 2:
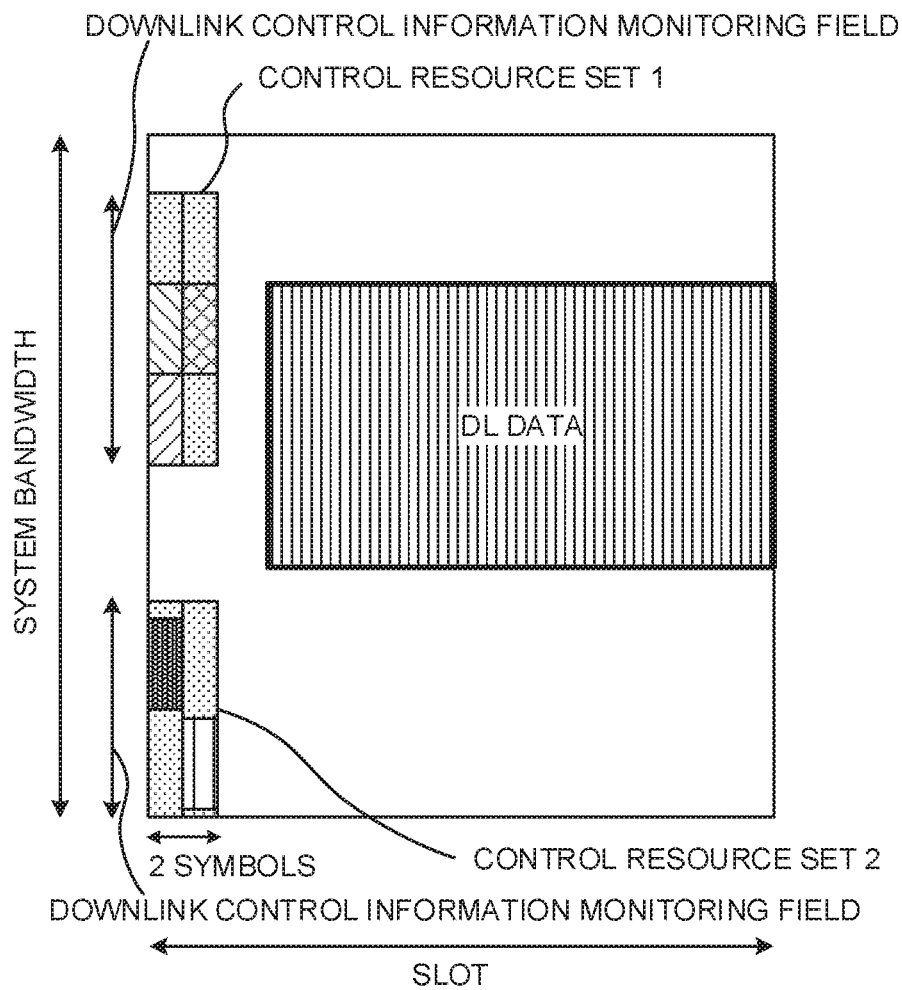
FIG. 2 is a diagram to illustrate allocation of downlink control channels (control resource sets) and DL data, which is different than in existing LTE systems.

The DL data illustrated in FIG. 2 is DL data for one of UEs #1 to #5. Furthermore, in control resource sets 1 and 2, resources other than the resources for downlink control signals for UEs #1 to #5 are not used to transmit downlink control information.

Assuming that downlink control information is transmitted using control resource sets, the present inventors have focused on where the locations to allocate scheduled data (for example, the location where the allocation starts) should be configured, and come up with the idea of allocating data in the same time location or different time locations in a predetermined frequency field (multiple resource blocks).

Now, embodiments of the present invention will be described below in detail with reference to the accompanying drawings. Although cases will be illustrated with the following embodiments where data scheduling is controlled on a per slot basis, other time units are equally applicable (for example, subframes, mini-slots, subslots, transmission time intervals (TTIs), short TTIs, radio frames, etc.).

First Embodiment

Figure 3:
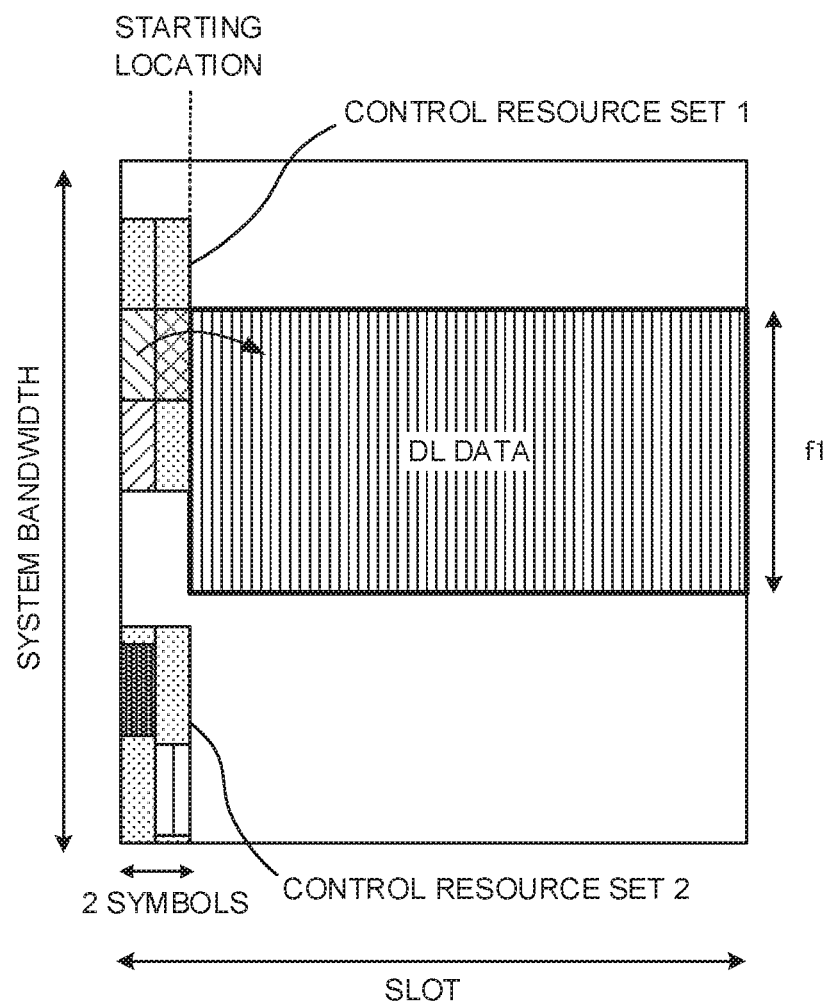
FIG. 3 is a diagram to illustrate locations where control resource sets and DL data are allocated, according to a first aspect of a first embodiment of the present invention.
Figure 4:
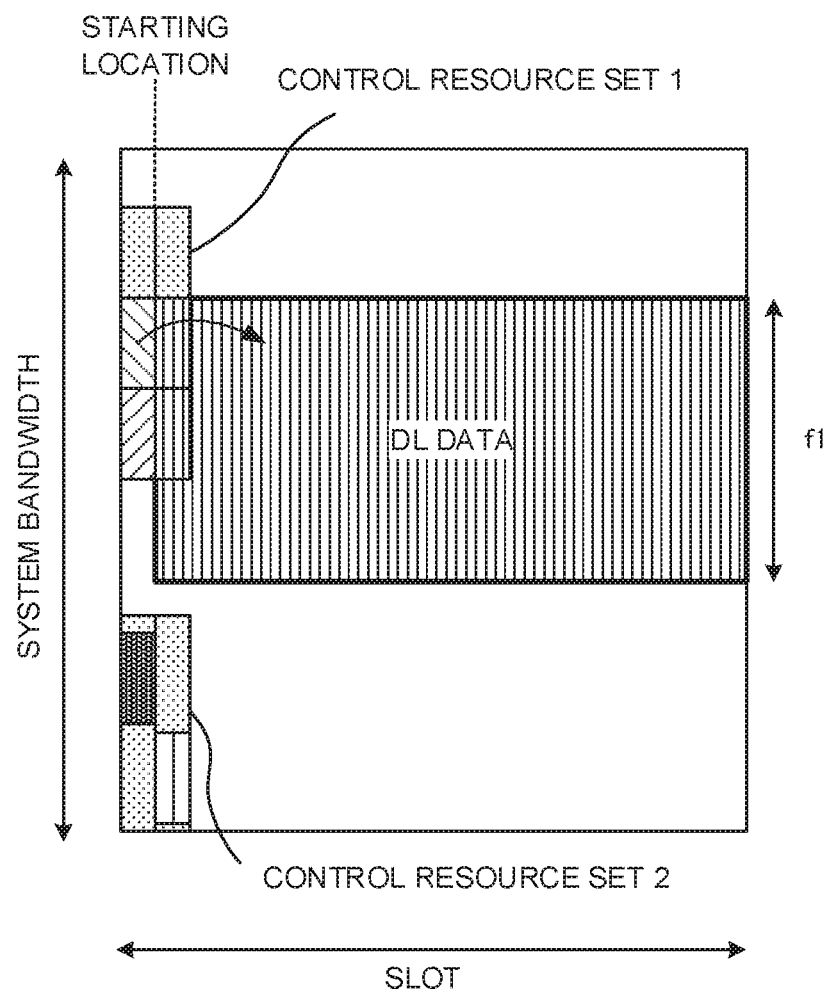
FIG. 4 is a diagram to illustrate locations where control resource sets and DL data are allocated, according to an alternative example of the first aspect of the first embodiment.
Figure 5:
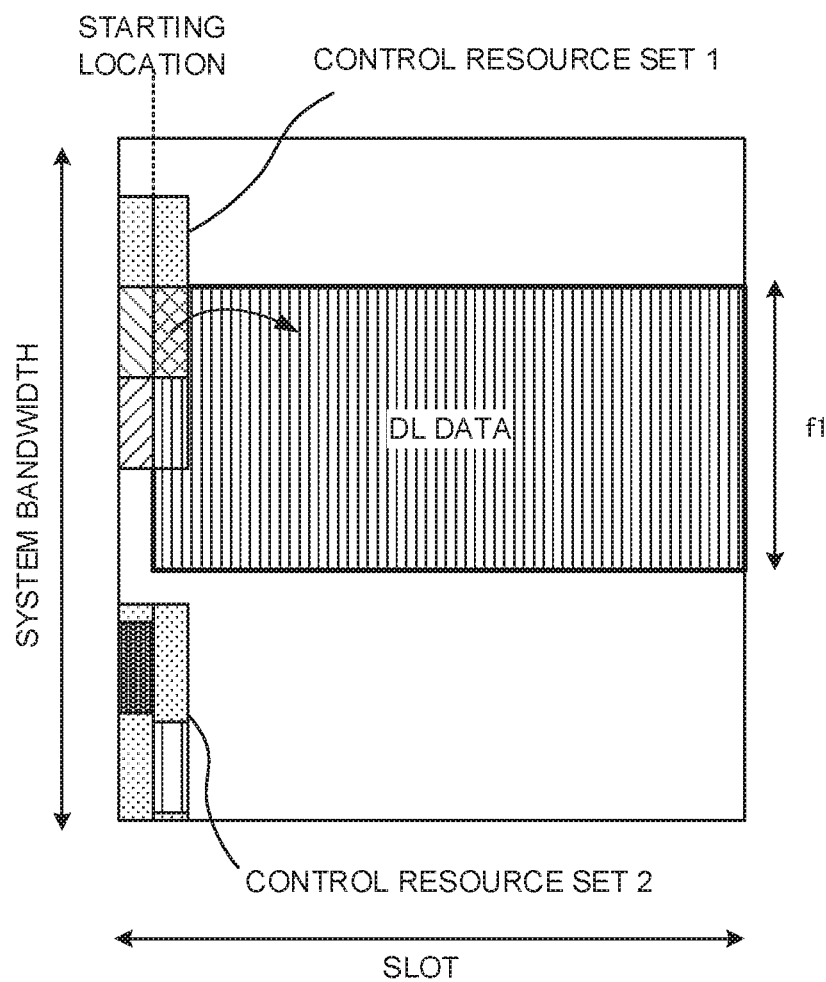
FIG. 5 is a diagram to illustrate locations where control resource sets and DL data are allocated, according to a second aspect and a third aspect of the first embodiment.
Figure 6:
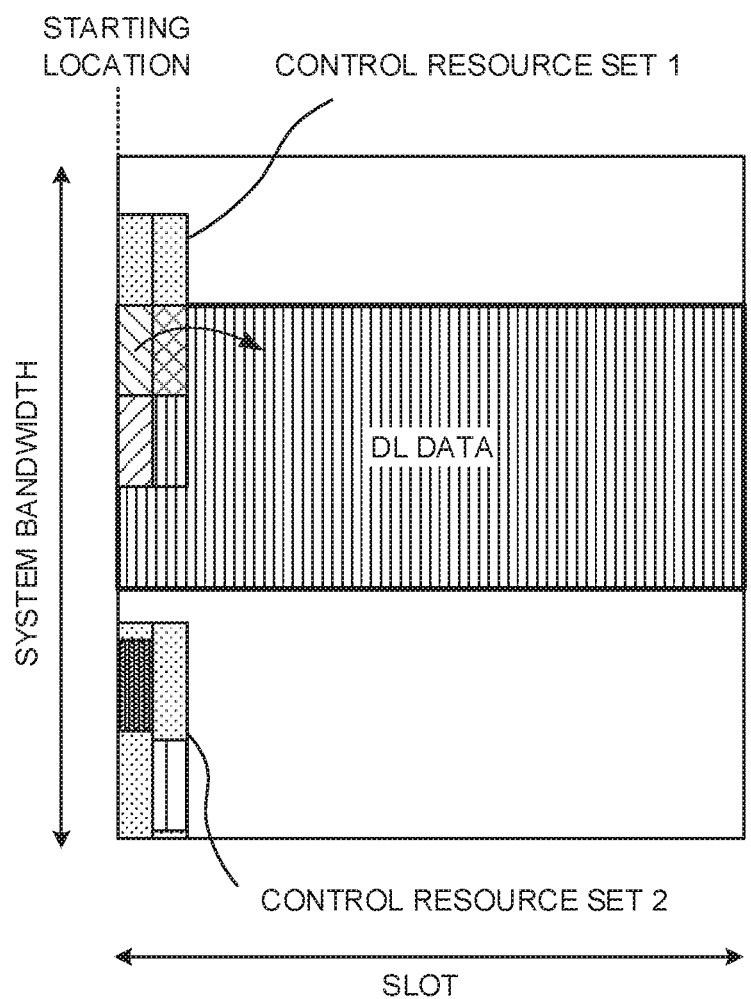
FIG. 6 is a diagram to illustrate locations where control resource sets and DL data are allocated, according to the second aspect and the third aspect of the first embodiment.

According to a first embodiment of the present invention, when downlink control information is transmitted using control resource sets, the location where scheduled data starts being allocated is configured in the same time location in a predetermined frequency field (multiple resource blocks). FIG. 3 and FIG. 4 are diagrams to explain a first aspect of the first embodiment. FIG. 5 and FIG. 6 are diagrams to explain a second aspect and a third aspect of the first embodiment.

(First Aspect)

FIG. 3 illustrates DL data, the schedule of which scheduling is reported in downlink control information of UE #1. DL data is configured such that the starting location in the scheduled resource block (in predetermined frequency field f1) is the same time location.

When scheduling DL data, a base station (gNB) determines the above-mentioned starting location so that the DL data does not overlap (overlay) any of downlink control information (DCI), a search space (SS) and a control resource set. By this means, on the user terminal (UE) side, there is no need to perform the demodulation process caused by the above overlap, and therefore power consumption can be reduced. Note that the amount of radio resources used increases in order of DCI, an SS, and a control resource set.

Furthermore, in FIG. 3, the location where scheduled DL data starts is configured in the location where control resource set 1 ends, but this starting location may be configured in control resource set 1. For example, if the downlink control information for UE #3 in FIG. 3 is not allocated and the corresponding resource is unoccupied, as illustrated in FIG. 4, the starting location may be configured in the second symbol of a control resource set. In this case, the DL data does not overlap with the downlink control information of UE #1, so that the gNB does not have to perform overlap-induced processes. In addition, the DL data can be transmitted using unoccupied resources in the control resource set.

According to the first aspect, it is possible to allocate (schedule) DL data by reducing the fields to allocate control information, so that it is possible to reduce the overhead and improve the efficiency of the use of resources. Accordingly, even when different downlink control channels from those of existing LTE systems are configured, data communication processes can be performed adequately.

(Second Aspect)

While, according to the above-described first aspect, DL data is configured so as not to overlap (overlay) with any of downlink control information (DCI), a search space (SS) and a control resource set, with a second aspect of the first embodiment, DL data can (may) overlap one of downlink control information (DCI), a search space (SS) and a control resource set.

FIG. 5 illustrates DL data, the schedule of which is reported in downlink control information for UE #3. The starting location of the DL data is configured in the second symbol of a control resource set. As is apparent from this drawing, the downlink control information for UE #3 overlaps a part of the DL data.

That is, upon scheduling DL data for UE #3, the gNB has to determine the starting location of the DL data, part of the DL data is permitted to overlap the downlink control information for UE #3. In this case, the gNB applies rate matching to the overlapping part. That is, rate matching is applied to the transmitting DL data based on the premise that no DL data can be arranged on resources where DCI is mapped.

The UE can detect downlink control information addressed to the UE by performing blind decoding in the search space. Accordingly, the UE detects DCI addressed to the UE, and identifies the resource for the DL data scheduled by this DCI. If the resources of the DCI and the scheduled DL data overlap, de-rate matching (rate matching process) is applied to DL data that is received, based on the premise that no DL data is arranged on the resource where the DCI is mapped.

Meanwhile, as illustrated in FIG. 6, downlink control information that is not directed to the UE may overlap the DL data. FIG. 6 illustrates DL data, the schedule of which scheduling is reported in downlink control information for UE #1. The starting location of the DL data is configured at the beginning of the slot—that is, the starting location of a control resource set.

In this case, as illustrated in this drawing, downlink control information for UE #2 and UE #3 overlap the DL data for UE #1. Generally, a UE cannot detect DCI for other UEs. This is because the CRC check code varies per UE. Consequently, in the DL data scheduled for UE #1, the gNB punctures the part of the DL data where downlink control information for UE #2 and UE #3 is mapped. In this case, UE #1 performs the receiving/decoding processes without recognizing that part of the DL data has been punctured. If the coding rate is small enough, or if the amount of punctured resources is substantially small compared to the amount of scheduled resources, the deterioration due to this puncturing can be reduced. Alternatively, the gNB may puncture the downlink control information for UE #2 and UE #3 so as to prioritize the DL data scheduled for UE #1. In this case, since the DL data to send to UE #1 is not punctured, the deterioration of performance can be reduced.

Note that, although this will be described later with a third embodiment of the present invention, the punctured part in DL data may be reported from the gNB to the UE through L1 signaling. In this case, DCI may be used. The UE depunctures (puncturing process) the punctured part of the DL data. Also, although a case has been described with the second aspect where downlink control information and DL data overlap, this downlink control information may be at least one of DCI, an SS, and a control resource set. That is, the above-described rate matching and/or puncturing process may be performed in any of DCI units, SS units, and control resource set units.

According to the second aspect of the present invention described above, the starting location of DL data can be configured to overlap a control resource set, so that the resources that have become available as a result of reducing the fields to allocate control information can be used for data transmission, and, in addition, a greater amount of data can be transmitted. Consequently, the efficiency of the use of resources can be improved. Accordingly, even when different downlink control channels from those of existing LTE systems are configured, data communication processes can be performed adequately. Also, by using de-rate matching (rate matching process), it is possible to demodulate downlink control information addressed to the subject terminal with high accuracy.

(Third Aspect)

Next, a third aspect will be described. According to the third aspect, puncturing is used instead of rate matching of the second aspect described above. The arrangement/structure of one slot is the same as in FIG. 5 and FIG. 6, which relate to the second aspect. Therefore, only parts that are different from the second aspect will be explained below.

To be more specific, in FIG. 5, downlink control information for the subject terminal (downlink control information for UE #3) and the DL data overlap, so that the gNB punctures the DL data in this overlapping part. The UE detects the downlink control information addressed to the UE by performing blind decoding, and, if the DL data scheduled by this DCI overlaps the above DCI, the UE depunctures (puncturing process) the DL data of the overlapping part.

According to the third aspect of the present invention described above, the starting location of DL data can be configured to overlap a control resource set, so that the resources that have become available as a result of reducing the fields to allocate control information can be used for data transmission, and, in addition, a greater amount of data can be transmitted. Consequently, the efficiency of the use of resources can be improved. Accordingly, even when different downlink control channels from those of existing LTE systems are configured, data communication processes can be performed adequately.

Note that, while the second aspect that performs rate matching is preferable from the perspective of the accuracy of demodulation, from another perspective, the rate matching and de-rate matching processes in the gNB and the UE are complicated. Puncturing is a simple process that simply removes previously-generated data (that is, punctures specific bits, resource elements (RE), resource blocks (RB) or symbols). Therefore, according to the third aspect, the processing burden on the gNB and the UE can be lightened.

Furthermore, although a case has been described above with the third aspect where downlink control information overlaps DL data, this downlink control information may be at least one of DCI, an SS, and a control resource set.

Second Embodiment

According to a second embodiment of the present invention, when downlink control information is transmitted using control resource sets, the location where scheduled data starts being allocated is configured in different time locations in a predetermined frequency field (multiple resource blocks). Different time locations may be configured depending on resource blocks, resource block groups and so on.

Figure 7:
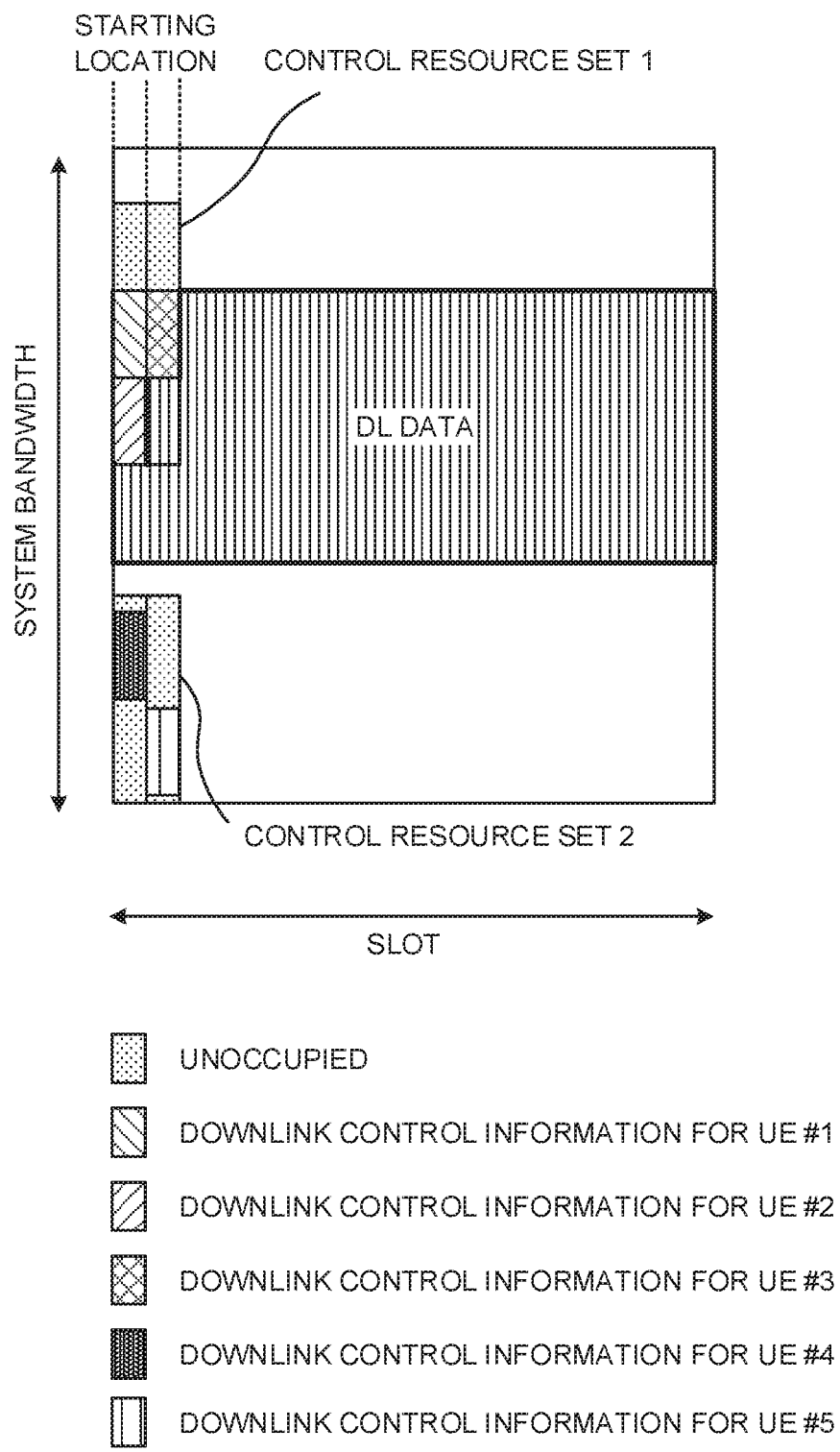
FIG. 7 is a diagram to illustrate locations where control resource sets and DL data are allocated, according to a second embodiment of the present invention.

FIG. 7 illustrates DL data configured so that there are varying data allocation starting locations. The schedule of the DL data is reported in downlink control information for one of UEs #1 to #5. Thus, since the location to start data allocation is configured in different time locations in a predetermined frequency field (multiple resource blocks), resources that have been made available as a result of reducing the fields to allocate control information can be used for data transmission. Consequently, the efficiency of the use of resources can be improved. Therefore, even when downlink control channels that are different from those of existing LTE systems are configured, data communication processes can be performed adequately.

Note that, although the starting locations in FIG. 7 are configured so that the DL data and the downlink control information do not overlap, this is by no means limiting. DL data and downlink control information are permitted to overlap each other, and rate matching and/or puncturing may be applied to the overlapped part, as in the second aspect or the third aspect of the above-described first embodiment.

Note that, when configuring starting locations in different time locations, it may be possible to, for example, configure one time location first, and change this time location (configure different values) depending on resource blocks and/or resource block groups. When making changes, the difference from the configured time location is reported, so that time location can be configured depending on resource blocks and/or resource block groups. Alternatively, a table in which a plurality of time locations are provided may be reported in advance to the UE, and the time location may be changed based on indices reported from the gNB to the UE.

Third Embodiment

The starting location in the first embodiment and the second embodiment described above needs to be reported to the UE. With a third embodiment of the present invention, how to report the starting location to the UE will be described.

(First Reporting Method)

In the first reporting method, the starting location is reported using DCI. The starting location is indicated in a field provided in DCI. The information in the field may be information that indicates the location (gap) from the beginning of the slot. Alternatively, assuming that a table in which a plurality of time locations are set forth is reported to the UE in advance, and the information in the field may be an index that specifies a time location provided in this table as an entry.

According to the first reporting method, starting locations that are configured as appropriate depending on control resource sets and/or downlink control information allocated to these control resource sets can be reported per slot and per UE. As a result of this, even when different downlink control channels from those of existing LTE systems are configured, data communication processes can be performed adequately.

(Second Reporting Method)

Figure 8A:
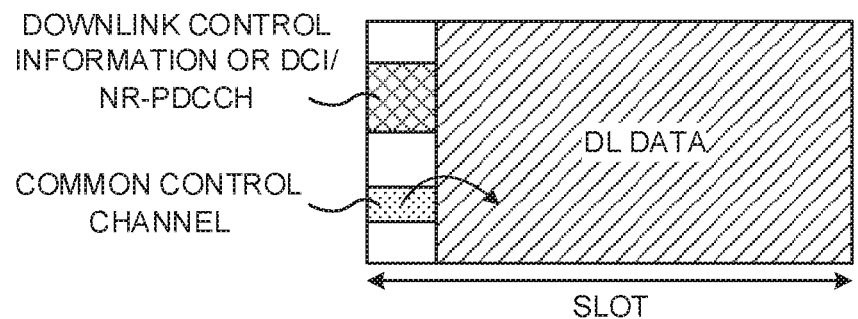
FIGS. 8A and 8B are diagrams to illustrate locations where control resource sets, common control channels and DL data are allocated, according to a second reporting method of a third embodiment of the present invention.
Figure 8B:
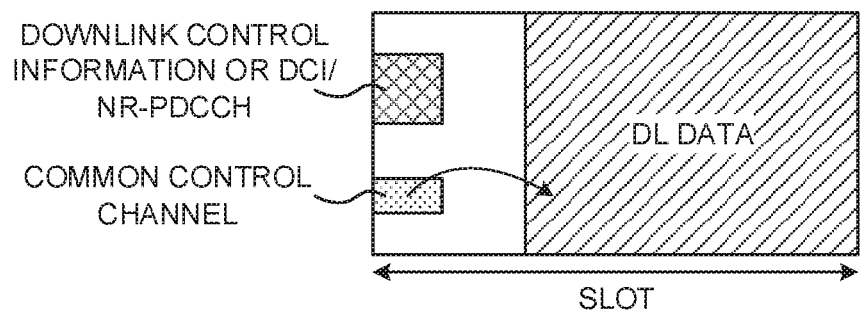

According to a second reporting method, starting locations are reported using a common control channel. As illustrated in FIGS. 8A and 8B, the common control channel may be, for example, a control signal or a channel that is different from scheduling information (DCI). The common control channel is a channel that is common to a plurality of UEs (in a UE group), and is also referred to as "common PDCCH," "NR-common PDCCH," and so on. Reporting using such a channel is also referred to as "common L1 signaling" or "common signaling."

The amount of DL data (the amount of resources scheduled) can be changed at the starting locations specified by the common control channel (FIGS. 8A and 8B). Here, the DL data may be replaced with transport blocks/code blocks (TBs/CBs) that are scheduled.

According to the second reporting method, starting locations that are configured as appropriate according to downlink control information (DCI) can be reported per slot. Furthermore, since it is possible to report a starting location that is common to multiple UEs, the gNB can control DL data allocation for multiple UEs (UEs in a UE group) collectively. As described above, even when downlink control channels different from those of existing LTE systems are configured, data communication processes can be performed adequately.

(Alternative Example of Second Reporting Method)

Figure 9A:
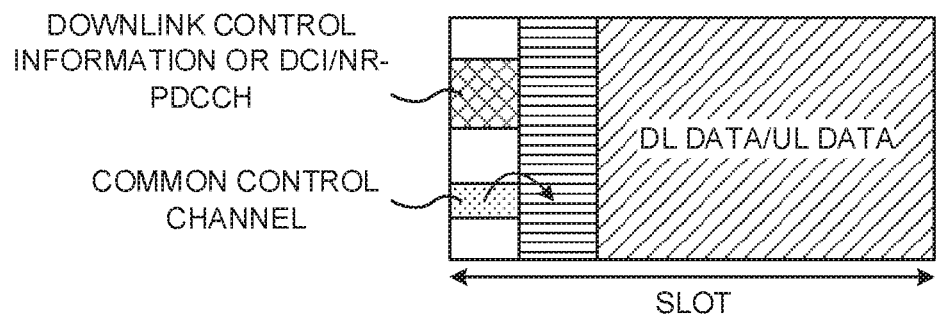
FIGS. 9A and 9B are diagrams to illustrate locations where control resource sets, common control channels and DL data are allocated, according to an alternative example of the second reporting method of the third embodiment.
Figure 9B:
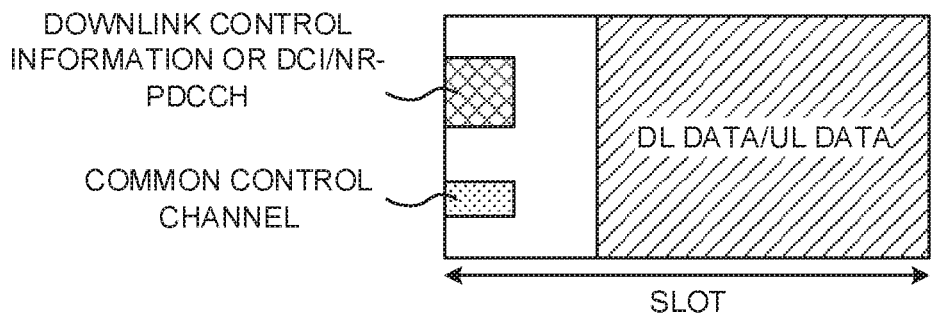

According to an alternative example of the second reporting method, a starting location of DL data is fixed semi-statically, and starting locations of other DL data than this DL data are reported using the above-described common control channel. For example, in FIGS. 9A and 9B, the starting location of DL data is fixed (fixed DL data). Meanwhile, as illustrated in FIG. 9A, the starting location of new (additional) DL data that is allocated to a resource not overlapping the above fixed DL data or the downlink control information may be designated using the common control channel.

The starting location of new DL data may be designated by the common control channel when the gNB detects that there is an unoccupied resource between the fixed DL data and the downlink control information.

Furthermore, the starting location of new (additional) data that is designated using the above common control channel is by no means limited to the downlink. For example, this designation of new data's starting location may be applied to uplink transmission from the UE to the gNB.

According to the alternative example of the second reporting method, in addition to DL data/UL data where the starting location is fixed semi-statically, new (additional) DL data/UL data that is specified by a common control channel can be reported to multiple UEs. Consequently, the gNB can control allocation of DL data for multiple UEs (UEs in a UE group) collectively, so that data communication processes can be performed adequately even when downlink control channels that are different from those of existing LTE systems are configured.

According to the first reporting method described above, when the common control channel fails to be received, there is no way knowing in which location DL data starts, and the DL data cannot be received. Also, according to the second reporting method, if the common control channel fails to be received, it is not possible to know the starting location of DL data, and therefore the DL data cannot be received. By contrast now, with an alternative example (FIG. 9A) of the second reporting method, even if receipt of the common control channel fails, as long as DCI is received successfully, at least a part of the DL data contained in that slot can be demodulated. This can prevent the situation where the UE is unable to operate at all.

The above common control channel may be the existing PCFICH. However, the PCFICH specifies the number of control channel symbols. Therefore, if the PCFICH fails to be received (decoded), neither control channels nor data channels can be received. On the other hand, according to the above-described alternative example of the second reporting method, even if one of a control resource set and the common control channel fails to be received, as long as the other one is received, it is still possible to prevent the situations where the UE is unable to operate at all.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 10:
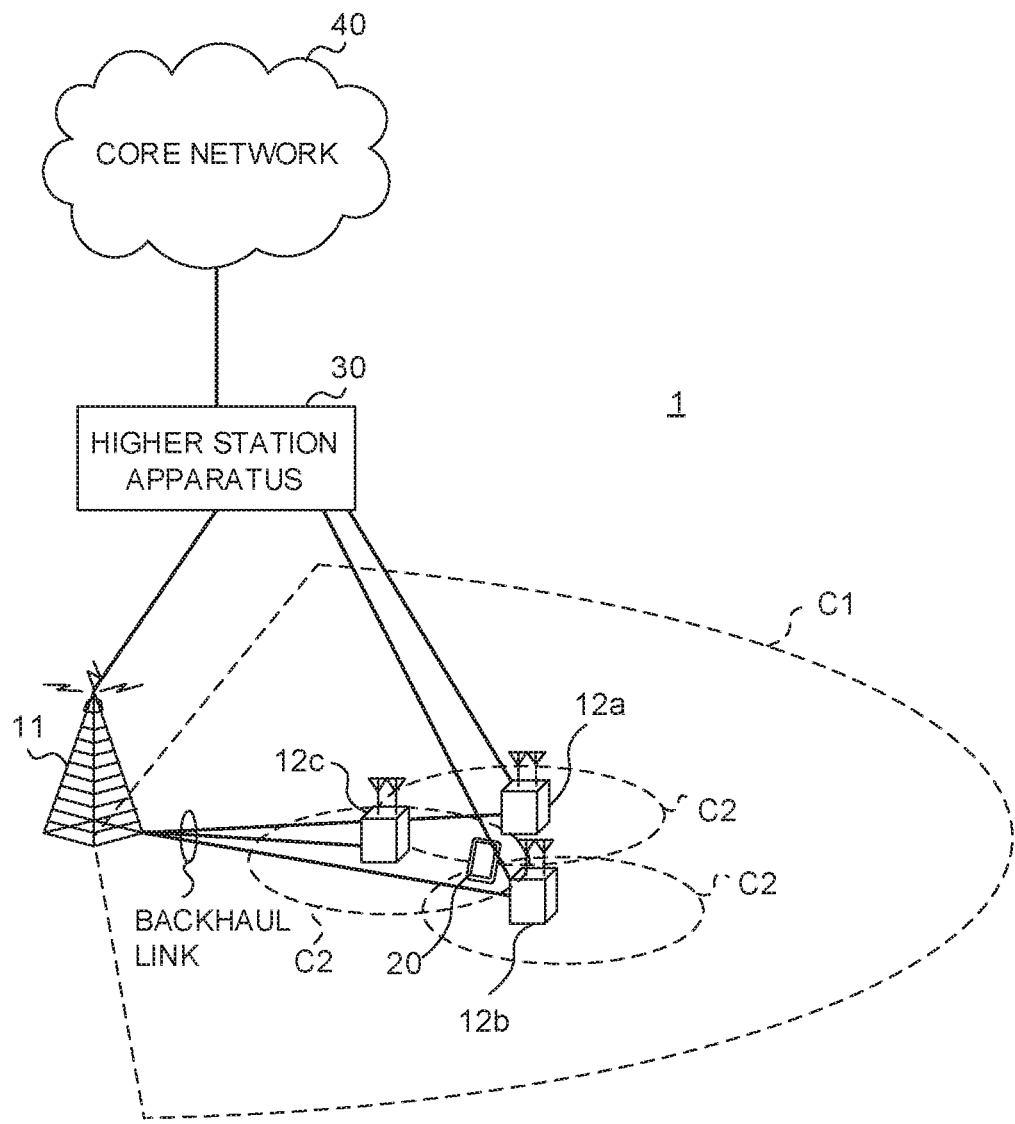
FIG. 10 is a diagram to illustrate an example of a schematic structure of a radio communication system according to an embodiment of the present invention.

FIG. 10 is a diagram to illustrate an example of a schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G", "IMT-Advanced," "4G (4th generation mobile communication system)," "5G (5th generation mobile communication system)," "FRA (Future Radio Access)," "New-RAT (Radio Access Technology)," "NR (New Radio)" and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement of cells and user terminals 20 are not limited to those illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or 6 or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

The radio communication system 1 may be configured so that different numerologies are used within cells and/or between cells. Note that a numerology refers to, for example, a set of communication parameters (for example, the subcarrier spacing, the bandwidth, etc.) that are used to transmit and receive a certain signal.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels.

User data, higher layer control information and so on are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 11:
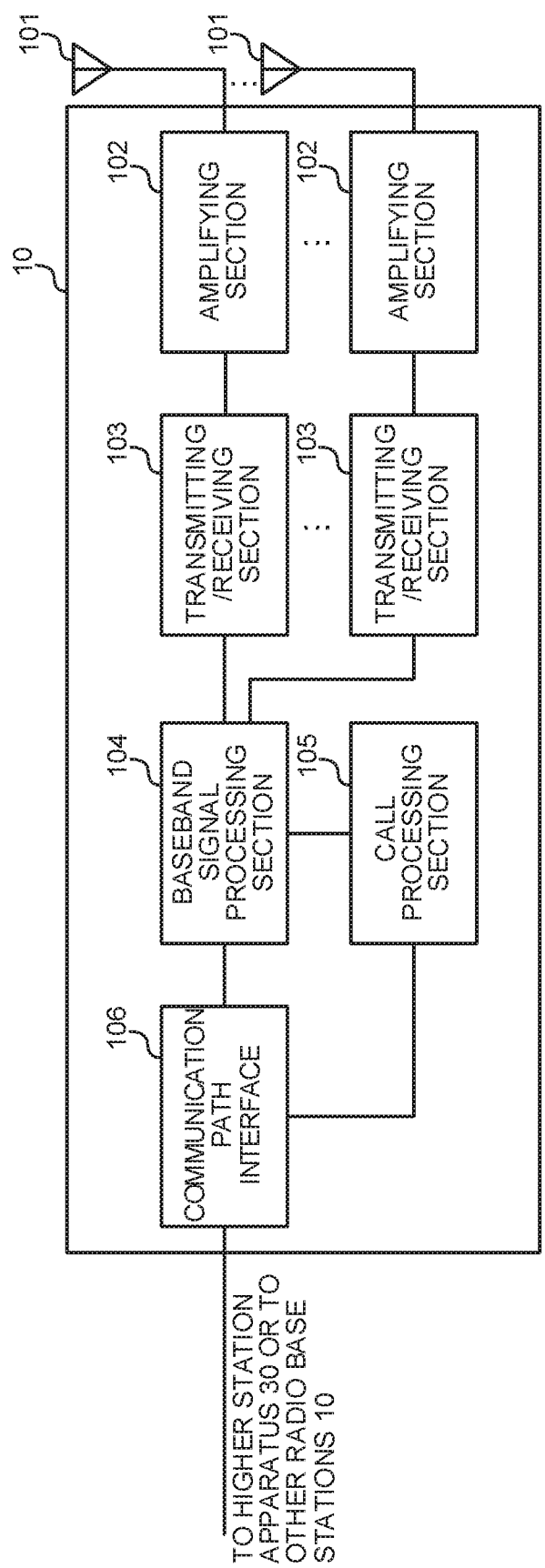
FIG. 11 is a diagram to illustrate an example of an overall structure of a radio base station according to an embodiment of the present invention.

FIG. 11 is a diagram to illustrate an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit a control resource set and/or a common control channel (FIG. 2 to FIG. 9). In addition, the transmitting/receiving sections 103 allocate downlink data over a predetermined frequency field from the same time location, or allocate downlink data to the predetermined frequency field from varying time locations, and report the schedule of the downlink data using the above control resource set or common control channel.

Figure 12:
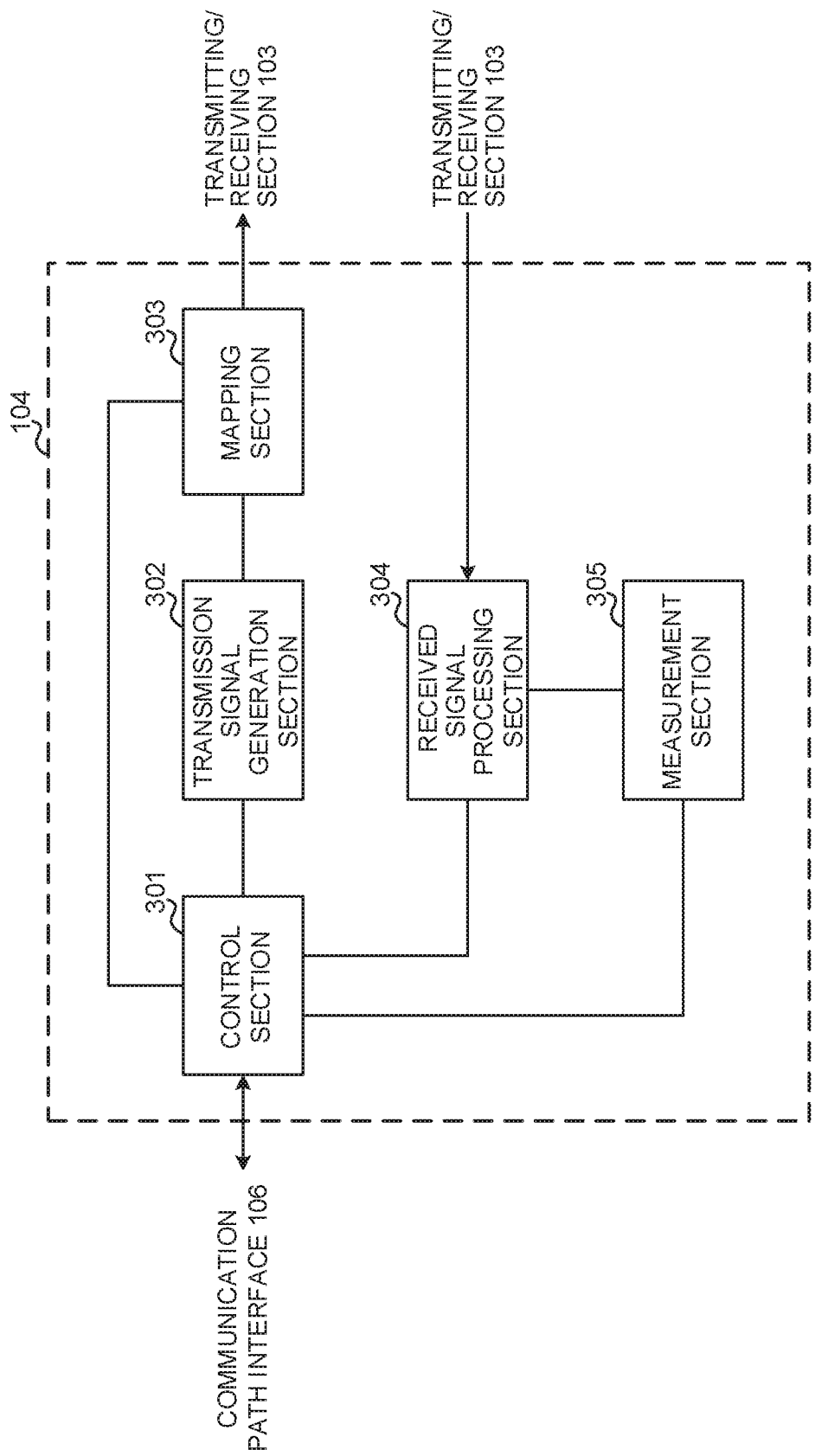
FIG. 12 is a diagram to illustrate an example of a functional structure of a radio base station according to an embodiment of the present invention.

FIG. 12 is a diagram to illustrate an example of functional structure of a radio base station according to one embodiment of the present invention. Note that, although this example primarily illustrates functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in downlink control channels). Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 controls the scheduling of uplink data signals (for example, signals transmitted in the PUSCH), uplink control signals (for example, signals transmitted in the PUCCH and/or the PUSCH), random access preambles transmitted in the PRACH, uplink reference signals, and so on.

The control section 301 controls transmission of control resource sets and downlink data. Furthermore, the control section 301 controls transmission of a common control channel. The control section 301 allocates downlink data over a predetermined frequency field from the same time location or allocates downlink data to the predetermined frequency field from varying time locations, and reports the schedule of the downlink data using the above control resource set or common control channel (FIG. 2 to FIG. 8).

Upon allocating downlink data, the control section 301 exerts control so that downlink control information included in a control resource set and downlink data are allocated not to overlapping each other, or downlink control information included in a control resource set and downlink data are allocated to overlap each other. The control section 301 may apply rate matching and/or a puncturing process to the overlapping part of the downlink control information and the downlink data.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), uplink channel information (for example CSI) and so on. The measurement results may be output to the control section 301.

(User Terminal)

Figure 13:
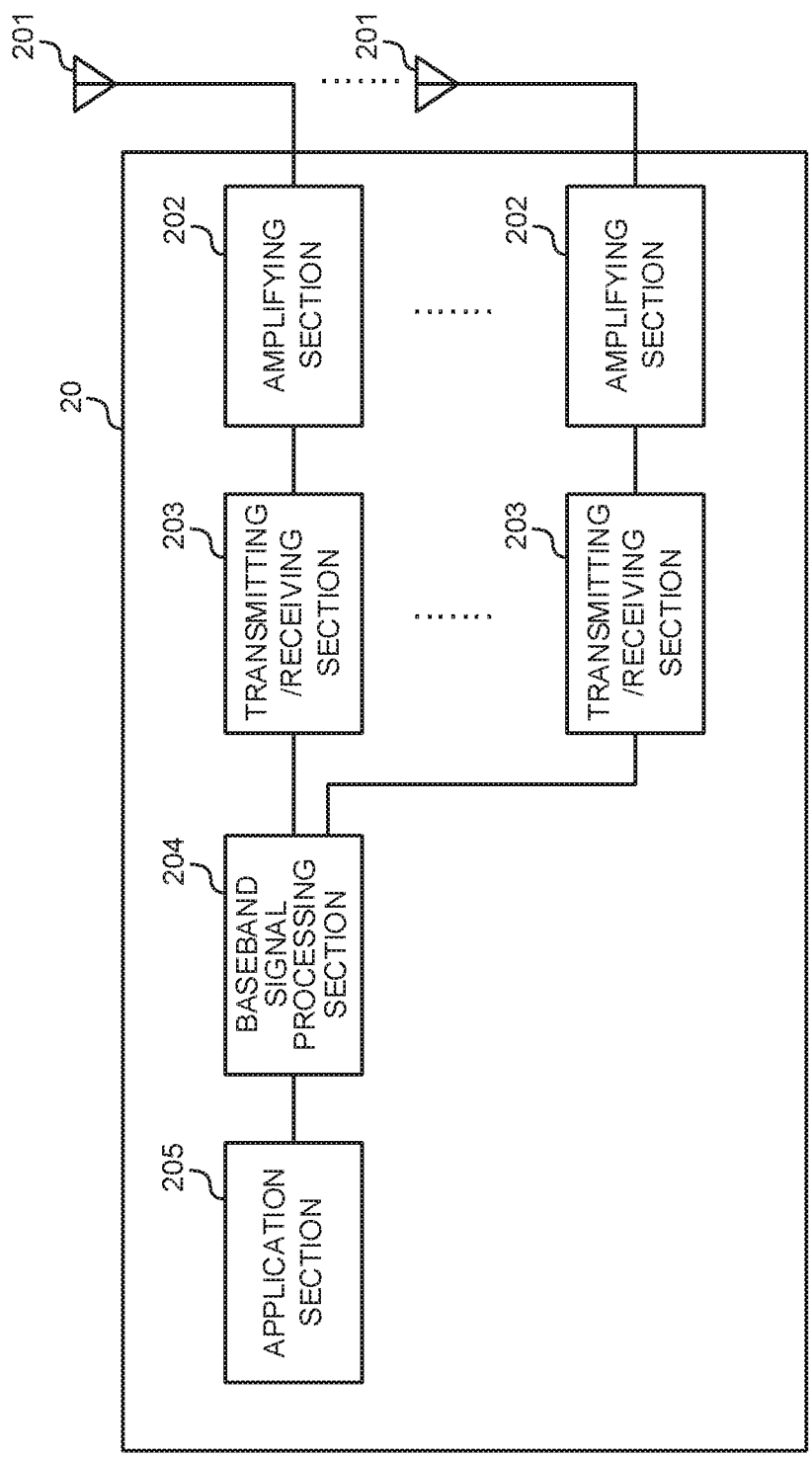
FIG. 13 is a diagram to illustrate an example of an overall structure of a user terminal according to an embodiment of the present invention.

FIG. 13 is a diagram to illustrate an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 receive a control resource set and/or a common control channel (FIG. 2 to FIG. 9). In addition, the transmitting/receiving sections 103 receive downlink data, the schedule of which is reported in the control resource set or the common control channel, and which is allocated over a predetermined frequency field from the same time location or allocated to the predetermined frequency field from varying time locations.

Figure 14:
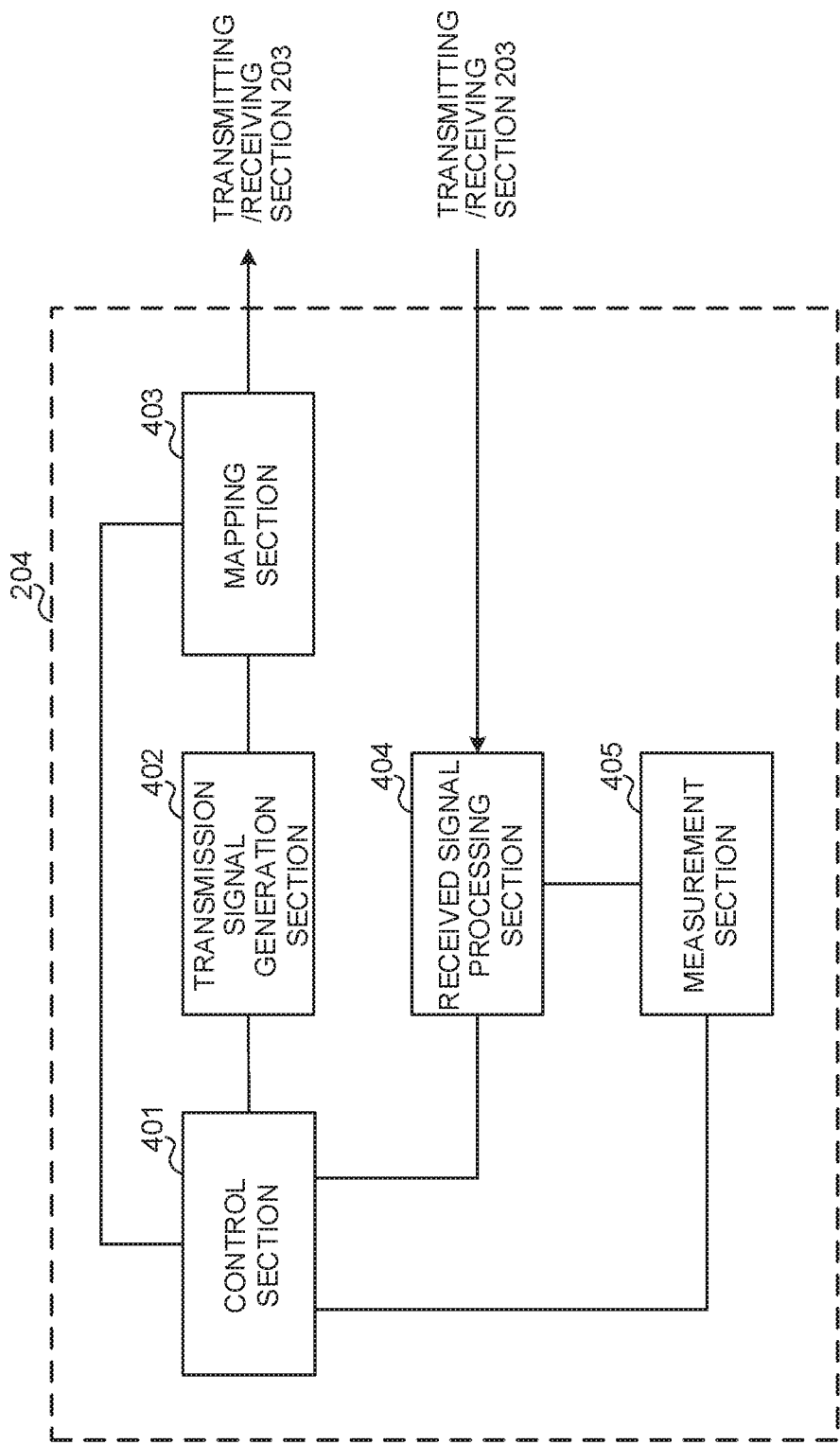
FIG. 14 is a diagram to illustrate an example of a functional structure of a user terminal according to an embodiment of the present invention.

FIG. 14 is a diagram to illustrate an example of a functional structure of a user terminal according to one embodiment of the present invention. Note that, although this example primarily illustrates functional blocks that pertain to characteristic parts of the present embodiment, the user terminal has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals (for example, signals transmitted in downlink control channels) and downlink data signals (for example, signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

The control section 401 controls receipt of a control resource set and downlink data. Furthermore, the control section 401 controls receipt of a common control channel. The control section 401 controls the receiving processes (decoding process and other processes) of downlink data, the schedule of which is reported in the control resource set or the common control channel, and which is allocated over a predetermined frequency field from the same time location or allocated to the predetermined frequency field from varying time locations (FIG. 2 to FIG. 8).

The downlink control information included in the control resource set and the downlink data are allocated not to overlap each other, or the downlink control information included in the control resource set and the downlink data are allocated to overlap each other. The control section 401 may apply rate matching and/or a puncturing process (processes including de-rate matching and/or depuncturing) to the overlapping part of the downlink control information and the downlink data.

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), down link channel information (for example CSI) and so on of the received signals. The measurement results may be output to the control section 401.

(Hardware Structure)

Note that the block diagrams that have been used to describe the above embodiments illustrate blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 15:
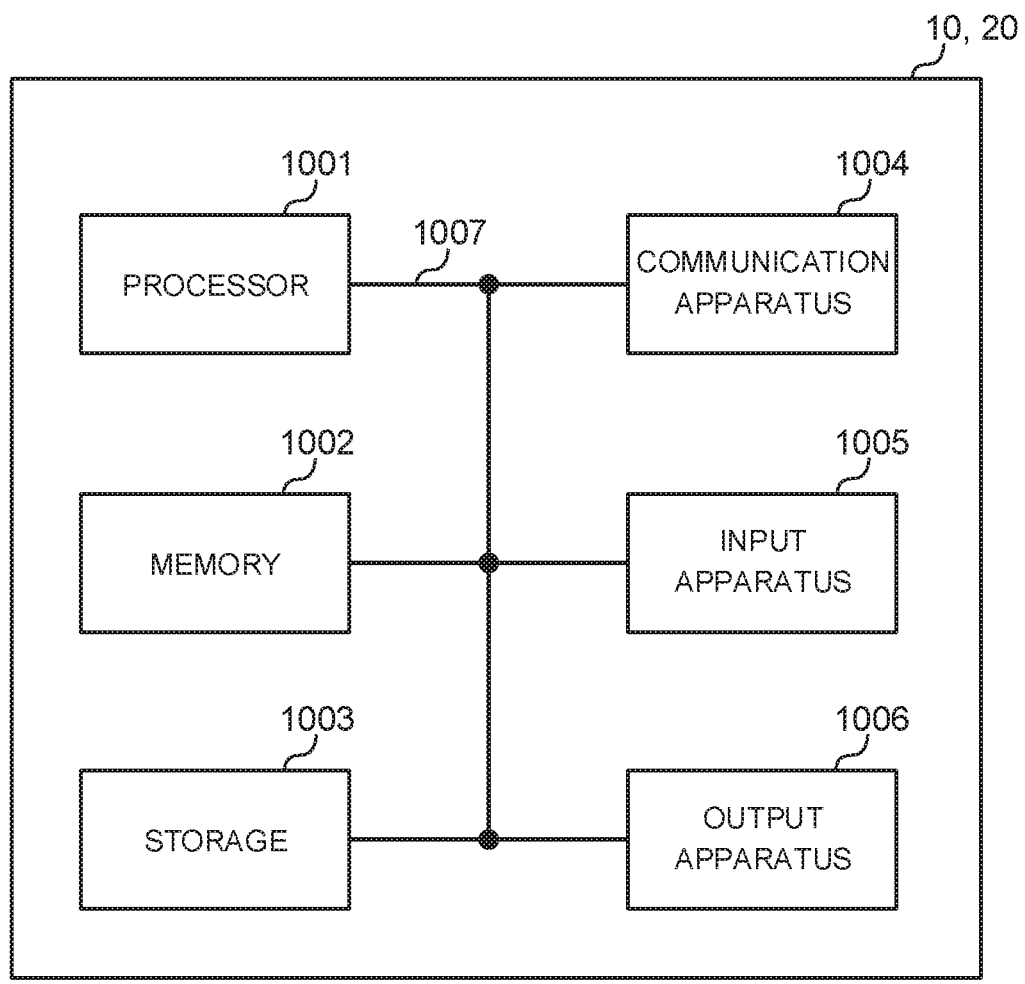
FIG. 15 is a diagram to illustrate an example hardware structure of a radio base station and a user terminal according to one embodiment of the present invention.

For example, the radio base station, user terminals and so on according to embodiments of the present invention may function as a computer that executes the processes of the radio communication method of the present invention. FIG. 15 is a diagram to illustrate an example hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus illustrated in the drawings, or may be designed not to include part of the apparatus.

For example, although only one processor 1001 is illustrated, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device." a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, one ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on neurology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval" (TTI), or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled.

A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI" (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell." "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

Note that the radio communication system 1 may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX (registered trademark)), IEEE 802.20, WB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2017-017971, filed on Feb. 2, 2017, including the specification, drawings and abstract, is incorporated herein by reference in its entirety.

The invention claimed is:

1. A terminal comprising:
   a receiver that receives downlink control information that is used for scheduling of a downlink shared channel, via a downlink control channel in a control resource set; and
   a processor that, when the downlink shared channel overlaps with the control resource set, assumes that a resource to which the downlink control information is mapped is not available for the downlink shared channel,
   wherein the processor determines a starting location in a time domain of the downlink shared channel based on the downlink control information, and
   wherein a field value in the downlink control information indicates an index for designating one of a plurality of starting locations that are provided in advance.

2. A radio communication method for a terminal, comprising:
   receiving downlink control information that is used for scheduling of a downlink shared channel, via a downlink control channel in a control resource set;
   when the downlink shared channel overlaps with the control resource set, assuming that a resource to which the downlink control information is mapped is not available for the downlink shared channel; and
   determining a starting location in a time domain of the downlink shared channel based on the downlink control information,
   wherein a field value in the downlink control information indicates an index for designating one of a plurality of starting locations that are provided in advance.

3. A base station comprising:
   a transmitter that transmits downlink control information that designates a scheduling of a downlink shared channel, via a downlink control channel in a control resource set; and
   a processor that, when the downlink shared channel overlaps with the control resource set, performs a control to not allocate the downlink shared channel to a resource to which the downlink control information is mapped,
   wherein the processor designates a starting location in a time domain of the downlink shared channel by using the downlink control information, and
   wherein a field value in the downlink control information indicates an index for designating one of a plurality of starting locations that are provided in advance.

4. A system comprising a terminal and a base station, wherein
   the terminal comprises:
      a receiver that receives downlink control information that is used for scheduling of a downlink shared channel, via a downlink control channel in a control resource set; and
      a processor of the terminal that, when the downlink shared channel overlaps with the control resource set, assumes that a resource to which the downlink control information is mapped is not available for the downlink shared channel,
      wherein the processor of the terminal determines a starting location in a time domain of the downlink shared channel based on the downlink control information, and wherein a field value in the downlink control information indicates an index for designating one of a plurality of starting locations that are provided in advance, and the base station comprises:
- a transmitter that transmits the downlink control information; and
- a processor of the base station that, when the downlink shared channel overlaps with the control resource set, performs a control to not allocate the downlink shared channel to the resource to which the downlink control information is mapped, wherein the processor of the base station designates a starting location in a time domain of the downlink shared channel by using the downlink control information.

* * * * *